June 17, 1958   F. C. LORNITZO   2,839,078
RELIEF VALVE
Filed July 3, 1953
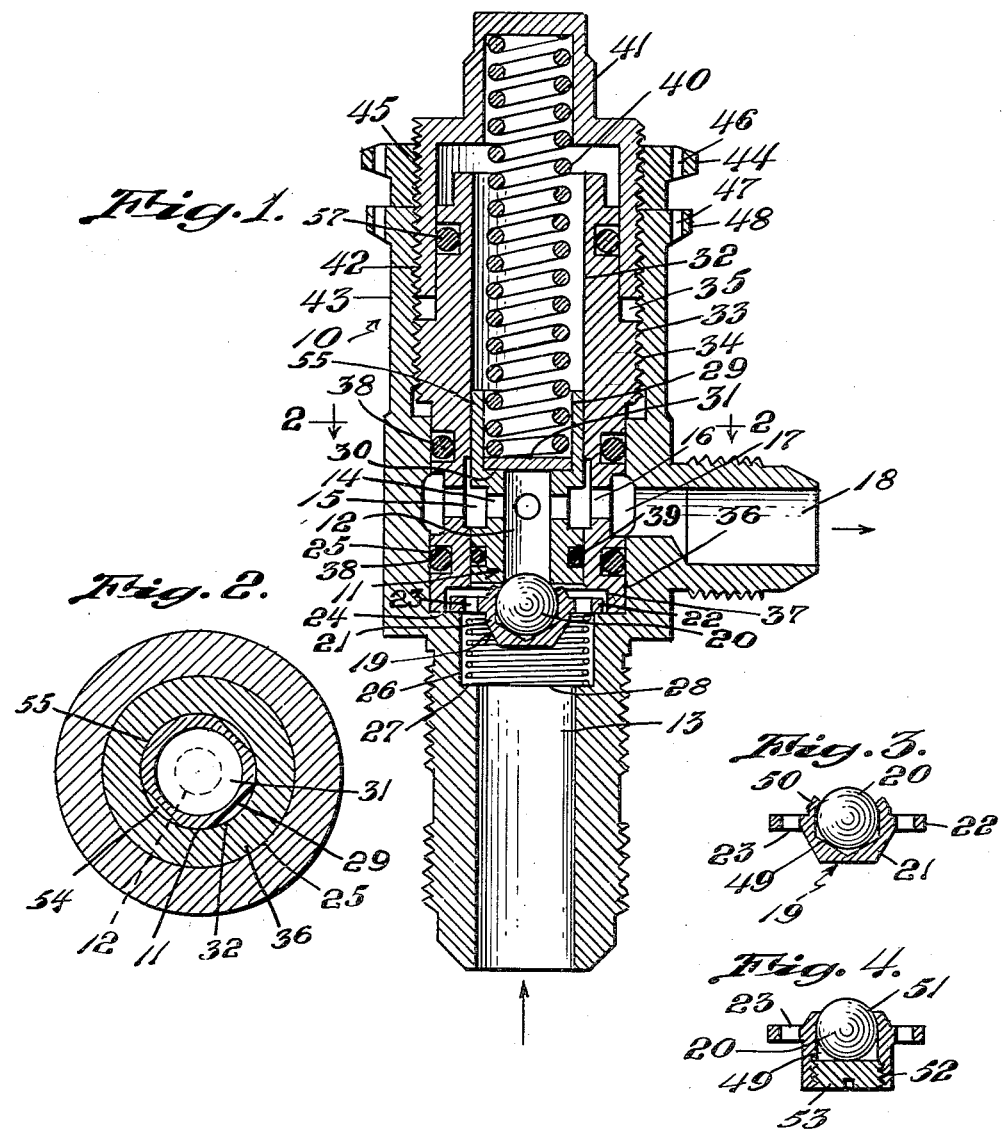
INVENTOR.
Frank C. Lornitzo
BY
Barlow & Barlow
ATTORNEYS United States Patent Office 2,839,078
Patented June 17, 1958

2,839,078
RELIEF VALVE

Frank C. Lornitzo, Pawtucket, R. I., assignor to Pantex Manufacturing Corporation, a corporation of Delaware Application July 3, 1953, Serial No. 365,873

3 Claims. (Cl. 137—508)

This invention relates to a hydraulic relief valve.

An object of the invention is to provide a relief valve constructed so as to substantially eliminate hunting and over-regulation thereof.

Another object of the invention is to provide a relief valve so constructed that when the plunger is moved to open position an additional surface area will be exposed to the action of the fluid pressure to oppose the closing force on the valve.

Another object of the invention is to provide a relief valve having a self-aligning valve closure element.

Another object is to provide a relief valve having a self-aligned valve closure element which can be manufactured at a comparatively low cost and will be durable and satisfactory in use.

A more specific object is to provide a ball valve closure in which the ball may be supported in a simple structure easily manufactured and assembled.

With these and other objects in view, the invention consists of certain novel features of construction as will be more fully described and particularly pointed out in the appended claims.

In the accompanying drawings:

Figure 1 is a central longitudinal sectional view through a relief valve embodying my invention;

Figure 2 is a sectional view taken substantially along line 2—2 of Figure 1 looking in the direction of the arows;

Figure 3 is a sectional view taken through a closure element of the valve; and

Figure 4 is a similar view of a modified valve closure.

Referring to the drawings, the casing or body 43 has an entrance port 13 and a discharge port 18 connected by bores of different diameters therethrough being progressively larger as they advance from the pressure end. Such bores are designated as 13, 26, 25, and 35. Between the bores 13 and 26 there is the shoulder 27, while between the bores 26 and 25 there is the shoulder 24. The largest bore 35 is threaded along its surface 34.

A guide 33 extends into the bore 25 and has threaded engagement with the threads 34 with its lower end engaging the shoulder 24. This guide is provided with a recess 37 at its lower end, which receives the assembly 19 shown in Figure 3. The guide 33 is recessed as is also the bore 25 at the location of the recess in the guide so as to provide a first chamber 17 surrounding the guide. Radial openings 16 are located to connect the interior of the guide with this chamber 17, and a discharge or return port 18. The guide is provided with annular recesses at either side of the chamber 17 in which there is located O-ring seals 38 so as to prevent liquid in the chamber 17 from moving in opposite directions from the chamber between the surfaces of the guide and the surfaces of the casing.

The unit 19 which is located in the recess 37 comprises a cup body 21 which receives a ball 20 with the edges of the ball 20 against the lower surface 49 of the cup, the upper edge of the cup being bent inwardly over the ball to provide a cage to prevent the ball from being moved out of the cup although being so spaced from the ball as to permit the ball to rotate in the cup to present a different surface thereof to the seat. This cup is also provided with a flange 22 which is of a size to engage the shoulder 24, while a plurality of openings 23 pass through the flange so as to permit the flow of liquid therethrough. A spring 28 engages the flange and also the shoulder 27 so as to urge the assembly 19 in the direction of flow of the liquid. This flange also engages the upper part of the recess 37 to limit its upward movement.

The guide 33 has a bore 32 extending centrally therethrough slidably receiving a valve seat 11 which is provided with a recess in which is located an O-ring 39 providing sealing engagement with the bore 32. This valve seat is provided with a central bore 12 therethrough which has radial openings 14 connecting the bore with this second annular chamber 15 formed by a recess in the valve seat and a recess in the guide at the location of the radial passages 16 so that the chambers 15 and 17 are connected. This valve seat is provided with a bore 29 at its upper end of a size sufficiently large to provide a shoulder 30 between the bore 12 and this bore 29. A closure 31 engages the shoulder 30 and is held in engagement therewith by means of a spring 40 which presses the valve seat into closed position to close the low pressure end of the bore. A cap 41 engages the outer end of the spring 40 and has threaded engagement as at 42 with the threads 34 of the casing and also is slidable along the guide 33 and is sealed therewith by means of the O-ring 57 located in a recess in the guide 33. By adjusting the screw cap 41, the spring pressure applied on the valve seat 11 can be altered as desired. A lock nut 44 screws on the outer side of the cap 41 as at 45 and engages against the adjacent end of the valve body 43 for holding the cap in adjusted position. Openings 46 in the nut 44 and similar openings 47 in a flanged portion 48 of the body 43 are provided through which a wire or the like (not shown) may be passed and then looped to have its free ends secured such as by a lead seal (not shown) to prevent the unauthorized tampering of the adjustment of spring 40.

In operation the valve seat 11 is normally biased against the closure 19 and its face is exposed to fluid pressure through openings 23, as shown in Figure 1. The closure 19 is also exposed to fluid pressure acting thereon in a direction tending to move the same onto the seat 11. Upon a sufficient increase in pressure of fluid at the pressure port 13 to overcome the bias of the spring 40, the valve seat 11 will under urge of the increased fluid pressure move axially against the opposing force of the said spring 40. Simultaneously, the closure 19 under bias of the spring 28 and the additional urge of the pressure of the fluid acting thereon will move in unison with the valve seat until stopped by engagement of its flange 22 with the bottom of the recess 37. Further movement of the valve seat 11 in the same direction will now free the same of the closure 19 to open the passage 12 to the flow of fluid to the return port 18. The flow through the passage 12 will have a tendency to continue in a straight path and thus impinge on the closure 31 to oppose to some degree the bias of the spring 40. Upon a pressure drop to that less than the bias of the spring 40, the valve seat 11 will return under urge of said spring 40 to seat on the closure 19 and thereby close the passage 12 to further flow of fluid therethrough. The portion of the bore 32 housing the spring 40 is open to the low pressure side of the valve seat 11 through one or more recesses 54 opening into annular recess 15 and formed by straight flats made in the outer surface of the valve seat 11 in the portion 55 thereof.

Upon any sudden or momentary increase in fluid pressure of a degree sufficient to cause an axial movement of the valve elements in a direction to open the passage 12, the closure 19 and valve seat 11 will move in unison before separation for the distance of the depth of the recess 37 as above described. By making the recess of a suitable depth, the opening of the valve may be nicely controlled and made to remain closed to any momentary increase or fluctuation in fluid pressure and also provide for any expansion in the fluid. The control of the axial movement of the valve seat and closure 21 substantially eliminates hunting and over-regulation of the spring bias on the valve seat 11.

It will be apparent that if the spring bias on the closure 19 were omitted and the said closure held stationary, the remainder of the valve would still be operative and effective in its operation in a hydraulic system in which sudden pressure increases or momentary fluctuations in pressure would be unlikely to occur.

The closure 19 is self-aligning with the valve seat 11 and may be constructed as shown in Figures 1 and 3 in which the cage 21 is provided with an opening or circular recess 49 in which the ball 20 is loosely received and secured in place by upsetting the stock about the outer edge of the recess as at 50. The cage may also be made as shown in Figure 4 in which the opening 49 is made to extend therethrough and is restricted as at 51 and threaded as at 52. The ball 20 is received in said opening to abut against the edges of the restricted edge 51 of the opening, and a threaded plug 53 is received to retain said ball 20 within the cage. In either construction shown in Figures 3 and 4, the ball may be self-turned within the cage so as to present a different surface engagement with the valve seat 11.

I claim:

1. A hydraulic relief valve comprising a valve body having a relief pressure port and return port, a slidable valve seat in said body having a surface area at all times exposed to relief port pressure tending to move said valve seat to open position, said valve seat having an axial passageway therethrough leading from said pressure port and provided with radial openings intermediate the ends thereof communicating with the return port for the flow of fluid from said pressure port to said return port, said valve seat being in slidable contact with said valve body on the side of said radial openings remote from said pressure port, a closing plug normally closing said passageway at the pressure port end thereof, a second closure normally closing the other end of said passageway, a spring in engagement with said second closure urging the valve seat to closed position in opposition to said fluid pressure acting on said valve seat and means providing a communication from the relief port to the side of the second closure engaged by said spring.

2. A hydraulic valve according to claim 1 wherein said second closure is a separate flat disk normally engaging a shoulder on said valve seat surrounding said passageway.

3. A hydraulic relief valve comprising a valve body having a relief pressure port and a return port, a slidable valve seat in said body having a surface area at all times exposed to relief port pressure tending to move said valve seat to open position, said valve seat having an axial passageway therethrough leading from said pressure port, a closure plug normally closing said passageway at the pressure port end thereof, a second closure normally closing the other end of said passageway, a spring in engagement with said second closure urging the valve seat to closed position in opposition to said fluid pressure acting on said valve seat, said valve seat being provided with a radial opening passing in a straight line completely through said seat without obstruction to cause a change of direction of fluid flow and adjacent said second closure, and communicating with said return port, said valve seat being in slidable contact with said valve body on the side of the radial openings remote from said pressure port, said second closure causing a change of direction of the fluid through said axial passageway so that the fluid will impinge on said second closure to oppose the said spring bias and means providing a communication from the relief port to the side of the second closure engaged by said spring.

References Cited in the file of this patent

UNITED STATES PATENTS

| 818,411 | Bush | Apr. 24, 1906 |
| 994,268 | Milne | June 6, 1911 |
| 1,152,604 | Coll | Sept. 7, 1915 |
| 1,182,166 | Graham | May 9, 1916 |
| 1,998,553 | Maxson | Apr. 23, 1935 |
| 2,013,372 | Work | Sept. 3, 1935 |
| 2,415,750 | Melichar | Feb. 11, 1947 |
| 2,416,091 | Fitch | Feb. 18, 1947 |
| 2,451,586 | Strid | Oct. 19, 1948 |
| 2,474,122 | Schneck | June 21, 1949 |
| 2,522,913 | Westman | Sept. 19, 1950 |
| 2,624,361 | Brown | Jan. 6, 1953 |
| 2,731,975 | Boals | Jan. 24, 1956 |

FOREIGN PATENTS

| 925,168 | France | Mar. 24, 1947 |